United States Patent
Arato et al.

(10) Patent No.: US 11,154,867 B2
(45) Date of Patent: Oct. 26, 2021

(54) SONIC REACTOR

(71) Applicant: Provectus Engineered Materiels Ltd., Vancouver (CA)

(72) Inventors: Claudio Arato, Vancouver (CA); Travis Janke, North Vancouver (CA)

(73) Assignee: Provectus Engineered Materiels Ltd., Vancouver (CA)

( * ) Notice: Subject to any disclaimer, the term of this patent is extended or adjusted under 35 U.S.C. 154(b) by 229 days.

(21) Appl. No.: 16/360,100

(22) Filed: Mar. 21, 2019

(65) Prior Publication Data

US 2019/0217306 A1    Jul. 18, 2019

Related U.S. Application Data

(62) Division of application No. 14/772,963, filed as application No. PCT/CA2014/050169 on Mar. 4, 2014, now Pat. No. 10,272,439.

(Continued)

(51) Int. Cl.
*B02C 17/00* (2006.01)
*B02C 17/14* (2006.01)
(Continued)

(52) U.S. Cl.
CPC .......... *B02C 17/14* (2013.01); *B01F 11/0241* (2013.01); *B01F 11/0266* (2013.01);
(Continued)

(58) Field of Classification Search
CPC ......... B02C 17/00; B02C 17/08; B02C 17/14; C02F 1/34; B01J 19/10
See application file for complete search history.

(56) References Cited

U.S. PATENT DOCUMENTS 2,468,515 A    4/1949  Robinson
2,725,219 A   11/1955  Firth
(Continued)

OTHER PUBLICATIONS

Written Opinion of the international Searching Authority dated Jun. 17, 2014 for International Application No. PCT/CA2014/050169.
(Continued)

*Primary Examiner* — Faye Francis
(74) *Attorney, Agent, or Firm* — Sean Mellino

(57) ABSTRACT

A sonic reactor for transferring kinetic energy to a process fluid medium has a resonant element horizontally oriented and mounted to the two resonance units using two or more nodal support rings located at the nodal positions of the resonant element. The nodal support rings are adjustable in position relative to the resonant element and the resonance units to permit positioning of the rings directly at the nodal positions during operation. The sonic reactor has a grinding or mixing chamber mounted at one or both of the free ends of the resonant element. The sonic reactor is used for applications that include fly ash beneficiation, pulverization and dispersion; fine ore grinding; preparing ready mix cement formulations; oil sands cuttings for oil recovery; spilled oil, water and oily water storage treatment; organic and inorganic industrial wastewater treatment; environmental remediation of contaminated soils; sodium dispersion and (Continued)

destruction of PCBs; biosludge conditioning; cellulosic biofuels processing; lignin processing; dispersion and deagglomeration of pigments; and dye destruction.

16 Claims, 4 Drawing Sheets

Related U.S. Application Data

(60) Provisional application No. 61/772,297, filed on Mar. 4, 2013.

(51) Int. Cl.
    *B02C 17/08*     (2006.01)
    *C10G 31/06*     (2006.01)
    *C10G 1/00*     (2006.01)
    *B01F 11/02*     (2006.01)
    *C02F 1/34*     (2006.01)
    *C02F 1/36*     (2006.01)
    *B01J 19/10*     (2006.01)
    *C02F 101/30*     (2006.01)
    *C02F 101/32*     (2006.01)
    *C02F 101/36*     (2006.01)

(52) U.S. Cl.
CPC ............... *B01J 19/10* (2013.01); *B02C 17/00* (2013.01); *B02C 17/08* (2013.01); *C02F 1/34* (2013.01); *C02F 1/36* (2013.01); *C10G 1/00* (2013.01); *C10G 31/06* (2013.01); *B01J 2219/08* (2013.01); *C02F 2101/30* (2013.01); *C02F 2101/308* (2013.01); *C02F 2101/32* (2013.01); *C02F 2101/363* (2013.01); *C02F 2201/004* (2013.01)

(56) References Cited

U.S. PATENT DOCUMENTS

| | | |
|---|---|---|
| 2,960,317 A | 11/1960 | Bodine, Jr. |
| 3,153,530 A | 10/1964 | Bodine |
| 3,645,458 A | 2/1972 | Tobe |
| 4,941,134 A | 7/1990 | Nyberg et al. |
| 5,005,773 A | 4/1991 | Nyberg et al. |
| 5,160,393 A | 11/1992 | Snyder |
| 5,318,228 A | 6/1994 | Macas |
| 2009/0038932 A1 | 2/2009 | Denslow et al. |

OTHER PUBLICATIONS

International Search Report from the ISA/CA dated Jun. 17, 2014 for International Application No. PCT/CA2014/050169.
International Preliminary Report on Patentability from the IPEA/CA date completed Apr. 15, 2015 for International Application No. PCT/CA2014/050169.
Search Report from the European Patent Office dated Nov. 25, 2016 for corresponding European Application No. 14759584.7.
Stokey, William F. "Vibration of systems having distributed mass and elasticty" Shock and vibration Handbook (1988): 7-1.

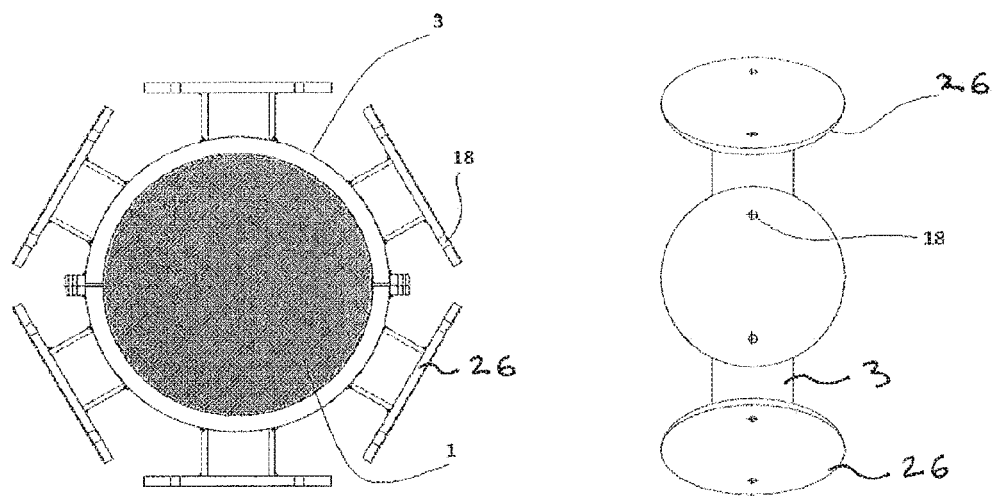
Fig. 3 AFig. 3 B
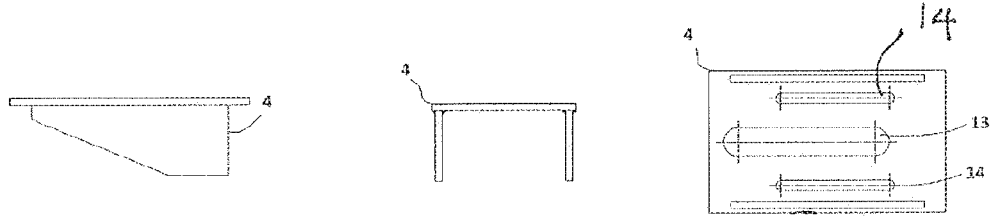
Fig. 4 AFig. 4 BFig. 4 C

SONIC REACTOR

CROSS-REFERENCE TO RELATED APPLICATIONS

This is a divisional application of application Ser. No. 14/772,963 filed Sep. 4, 2015, which is a U.S. national stage application of PCT/CA2014/050169 filed on Mar. 4, 2014, which claims priority to and the benefit of U.S. provisional application No. 61/772,297 filed on Mar. 4, 2013, all of which are incorporated herein by reference in their entireties.

FIELD OF THE INVENTION

The present invention pertains to sonic reactors used to transfer intense kinetic energy to process fluid mediums.

BACKGROUND OF THE INVENTION

Sonic reactors (sometimes called sonic generators) for converting electrical energy into kinetic energy via acoustic resonance for transfer to process fluid mediums are known and used in industrial applications. There has been successful innovation in the concept of exciting a cylindrical element, such as a bar or tube, into its natural resonance frequency, and allowing the resonant element to vibrate in a substantially unrestrained and free-floating manner. This allows for maximum and efficient transmission of the kinetic energy emitted by the resonant element into the fluid medium, thus minimizing energy losses to the support structure.

Industrial applications of sonic reactors include grinding or dispersing of agglomerated minerals, and concentrated mixing of solid, fluid and/or mixed solid-fluid mediums. The high intensity energy transferred to the fluid being processed facilitates deagglomeration of solids to allow for enhanced separation and recovery of desirable minerals, and uniformly distributes solid and/or fluid particles throughout the medium, which maximizes and intensifies the effective surface-to-surface contact shear area between fluid and/or solid mediums and allows for efficient conversion of desired chemical reactions and/or depositions.

Nyberg et al., U.S. Pat. No. 5,005,773, incorporated herein by reference, discloses a sonic generator with horizontal orientation of the resonant element as it applies to grinding applications. The patent states that "a resonant member is supported on nodal locations . . . which nodal points have been calculated or have been found by simply resonating the member and observing the nodal locations". However, the disclosed apparatus does not incorporate in its design the ability to account for small to large variations in the resonance frequency of the resonant element. When referring to sonic reactor applications that involve attaching a grinding or mixing chamber to one or more free ends of the resonant element, the patent does not take into account the effect that such attachment has on the natural resonance frequency of the resonant element, and thus on the nodal positions of the resonant element. As the grinding or mixing chambers are rigidly mounted directly to the resonant element itself, this effectively represents an increase in the length and mass of the resonant element, which directly influences the location of the nodal points. Prior art sonic reactor designs have not included a mechanism that allows for the adjustment of the nodal support ring position to account for this effect.

Actual operating conditions of sonic reactors in industrial practice typically vary greatly, and there exists a need for a mechanism that can be adjusted to the nodal positions of the resonant element with respect to mass additions to the free end or ends of the resonant element and/or variation in length of the resonant element itself.

SUMMARY OF THE INVENTION

The invention provides a sonic reactor in which the resonant element is horizontally oriented and is physically mounted to the resonance units using two or more nodal support rings located at the nodal positions of the resonant element. The nodal support rings are adjustable in position relative to the resonant element and the resonance units to permit positioning of the rings directly at the nodal positions during operation, where, for example, adjustment may be required due to changes in the total mass attached to one or both free ends of the resonant element.

Optionally, the position of the resonance units can also be adjusted, as required in response to variations in the nodal positions due to (a) changes in the total mass attached to one or both free ends of the resonant element and/or (b) the use of a different resonant element of substantially greater length and mass, such that the changes in nodal position are outside the attainable range of the adjustable nodal support ring structures. The position of the resonance units is adjustable by using a series of machinery skates under each footing of the resonance unit structure.

The resonant element is excited into its resonance state by two electromagnetic drive units, symmetrically located at opposite ends of the resonant element. Grinding or mixing chambers are attached to one or more free ends of the resonant element, and the process fluid medium being processed is passed through the chambers. For a grinding application, the grinding medium is contained within the grinding chamber using a series of screens so that the process fluid medium is allowed to pass through the grinding chamber without carrying any of the grinding medium with it at the egress of the grinding chamber.

The intended applications of the invention are as follows: fly ash beneficiation and pulverization; fine ore grinding; preparing ready mix cement formulations; treatment of oil sand cuttings for oil recovery; ecology pits for spilled oil or water storage; organic and inorganic industrial wastewater treatment; environmental remediation of contaminated soils; sodium dispersion and destruction of PCBs; biosludge conditioning; cellulosic biofuels processing; lignin processing; dispersion and deagglomeration of pigments; and dye destruction. The invention has no application to the solvent deasphalting of heavy oil via acoustic sonication.

Further aspects of the invention and features of specific embodiments of the invention are described below.

BRIEF DESCRIPTION OF THE DRAWINGS

FIG. 3A is an end view of the nodal support rings around the resonant element.

FIG. 3B is a top or bottom view of the nodal support rings around the resonant element.

FIG. 4A is a side view of the support ring bracket assembly.

FIG. 4B is an end view of the support ring bracket assembly.

FIG. 4C is a top view of the support ring bracket assembly.

DETAILED DESCRIPTION

Figure 1:
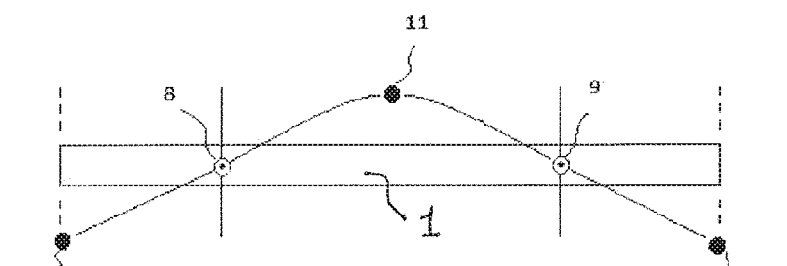
FIG. 1 is a schematic drawing of the resonant element at the first mode of resonance.

The invention provides a sonic reactor 24 comprising a resonant element 1, two electromagnetic drive resonance units 6 to cause vibration of the resonant element, one or more grinding or mixing chambers 19, two nodal support rings 3 supporting the resonant element, the support rings being adjustable in position relative to the resonant element to permit positioning of the support rings at nodal positions 8, 9 of the resonant element. Optionally, the electromagnetic drive resonance units are also adjustable in position relative to the resonant element to permit positioning of the support rings at nodal positions of the resonant element.

FIG. 1 illustrates the resonant element 1 at the first mode of resonance and shows the anti-node 11 between the free ends 10, 12 of the resonant element. The node points 8 and 9 are where the nodal support rings are ideally located. The location of these node points varies with respect to the total mass of the grinding or mixing chambers and fluid and/or solid medium load contained within the grinding or mixing chambers.

The length 8-9 ($L_{8-9}$) between the node points 8 and 9 is equal to ½ the wavelength of the first mode of resonance for the resonant element. Or, the length between the node points is:

$L_{8-9} = \lambda/2$ where: $\lambda$ is the wavelength of the first mode of resonance The length 10-8 ($L_{10-8}$) or 9-12 ($L_{9-12}$) between the node point 8 or 9 and the free end of the element 10 or 12, respectively, is equal to ¼ the wavelength of the first mode of resonance for the resonant element. Using length 10-8 as the example going forward, the length between the node point 8 and the free end of the element 10 is:

$$L_{10-8} = \frac{\lambda}{4}$$

where: $\lambda$ is the wavelength of the first mode of resonance

Combining the two equations, $L_{8-9}$ and $L_{10-8}$ are related, as follows:

$L_{8-9} = 2L_{10-8}$

According to acoustic resonance theory, an increase in length 10-8 causes a decrease in the frequency. In the context of the invention, such an increase in length 10-8 is a result of (a) the addition of a grinding or mixing chamber and corresponding grinding or mixing chamber load, or (b) and increase in the length of the resonant element itself.

For the case of (a), the actual length added by the grinding or mixing chamber differs from the theoretical or effective length ($L_E$) addition. Assuming a resonant element of uniform dimension, the effective length addition can be represented by the following simplified relationship:

$$L_E \propto \frac{M_{EQ}}{\rho_{RE} * SA_{X_{RE}}}$$

Where:

$M_{EQ}$ is the total mass of auxiliary equipment mounted to the end of the resonant element $\rho_{RE}$ is the density of the resonant element material $SA_{X_{RE}}$ is the cross sectional surface area of the resonant element Thus, in order to maintain the optimal location of the nodal support rings directly at the node points during operation, length 8-9 increases as follows:

$L_{8-9} = 2(L_{10-8} + L_E)$

It should be noted that this is a simplified approach used to demonstrate the relationship between the addition of mass to the end of the resonant element and the location of the node points. The location of mass addition along the resonant element is also a very important factor in determining the natural resonance frequency of the summative system (i.e. resonant element plus mounted equipment) and is internalized in the modeling described below.

The following three tables are a summary of dynamic analysis of a sonic reactor prototype which studies how the addition of equipment (i.e. in the form of a grinding or mixing chamber) affects the resonance frequency of the resonant element.

Table 1 summarizes the model input parameters for the finite elemental analysis of the sonic reactor prototype. This set of parameters was used to develop a relationship between chamber mass and resonant element/bar dimensions.

TABLE 1

Model Parameters

| Model Parameter | |
|---|---|
| Resonant element | Solid steel bar |
| Bar length | 3,300 mm |
| Bar diameter | 333.4 mm |
| Bar x-section area | 0.0875 m² |
| Mixing chamber mass | 63 kg |
| Magnet reaction structure mass | 130 kg |
| Adapter plate mass | 32 kg |
| Mixed medium mass | 8.4 kg |
| Material modulus of elasticity (steel) | 210 × 10⁹ Pa |
| Material density (steel) | 7,800 kg/m³ |

Table 2 summarizes the results of an experimental modal analysis performed on the sonic reactor prototype. The results confirm that the addition of equipment on the free end of the resonant element affects the distance between node points and thus the optimal location of the nodal support rings.

TABLE 2

Dynamic Test Results

| Chamber Mass (kg) | Frequency (Hz) | $L_{8-9}$ (m) |
|---|---|---|
| 0 | 115.25 | 1.93 |
| 80 | 101.25 | 2.07 |

Table 3 shows the results of the computational finite element analysis with respect to changes in chamber mass.

TABLE 3

Finite Element Analysis Results

| Chamber Mass (kg) | Frequency (Hz) | $L_{8-9}$ (m) |
|---|---|---|
| 0 | 115.10 | 2.06 |
| 80 | 101.84 | 2.12 |
| 90 | 100.55 | 2.16 |
| 100 | 99.32 | 2.20 |
| 110 | 98.16 | 2.22 |
| 120 | 97.04 | 2.23 |
| 130 | 95.98 | 2.24 |
| 140 | 94.96 | 2.25 |
| 150 | 93.98 | 2.26 |

Figure 2:
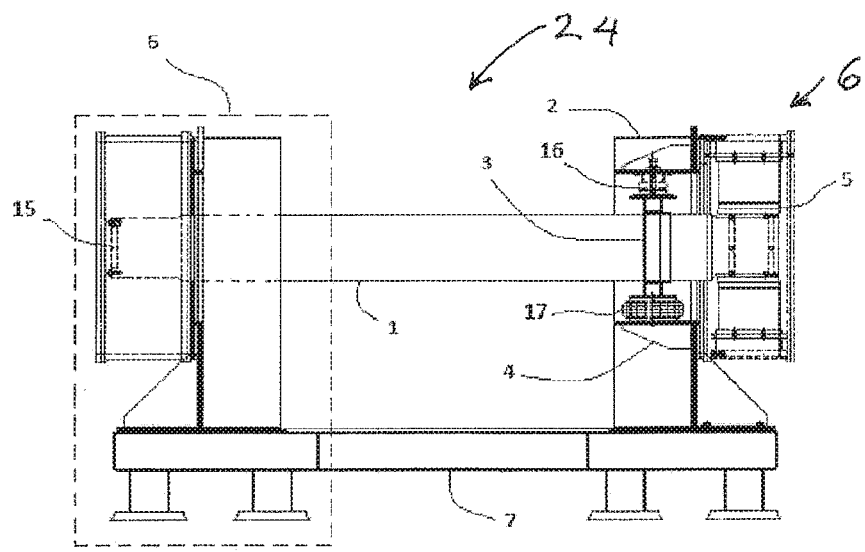
FIG. 2 is a partial sectional side view of the sonic reactor.

Referring to FIG. 2, the sonic reactor 24 has a horizontally oriented resonant element 1, mounted to the nodal support housing 2 via adjustable nodal support rings 3 at the node points of the resonant element. The nodal support rings 3 are mounted to the nodal support housing 2 via the support ring bracket assembly 4. Physically located in between the nodal support rings 3 and the support ring bracket assembly 4 are an alternating series of bumpers 16 (which are used to center the resonant element while it is not operational, i.e. during startup) and airbags 17 (which are used to maintain the centered position of the resonant element 1 during operation). These bumpers 16 and airbags 17 are physically mounted in one (i.e. a non-adjustable) position with respect to the nodal support rings 3, and thus are also adjustable in position relative to the resonant element 1.

The electromagnetic drive unit 5 and nodal support housing 2 together make up the resonance unit 6, which can be either (a) connected to the other resonance housing unit via resilient connection means 7 (e.g. welded and/or bolted), or (b) treated as a wholly separate unit from its counterpart and secured in place individually. This allows for macro changes in resonance frequency, and/or variation in the length of the resonant element 1 for different applications. For the case of (b), the resonance units are adjustable in position relative to the resonant element simply using industrial machine skates or a set of rollers. The sonic reactor 24 has two resonance units 6 which are identical, and are located symmetrically at either end of the resonant element 1. Grinding or mixing chambers 19 (see FIG. 6) are rigidly and externally mounted to one or both free ends of the resonant element 15.

Figure 5:
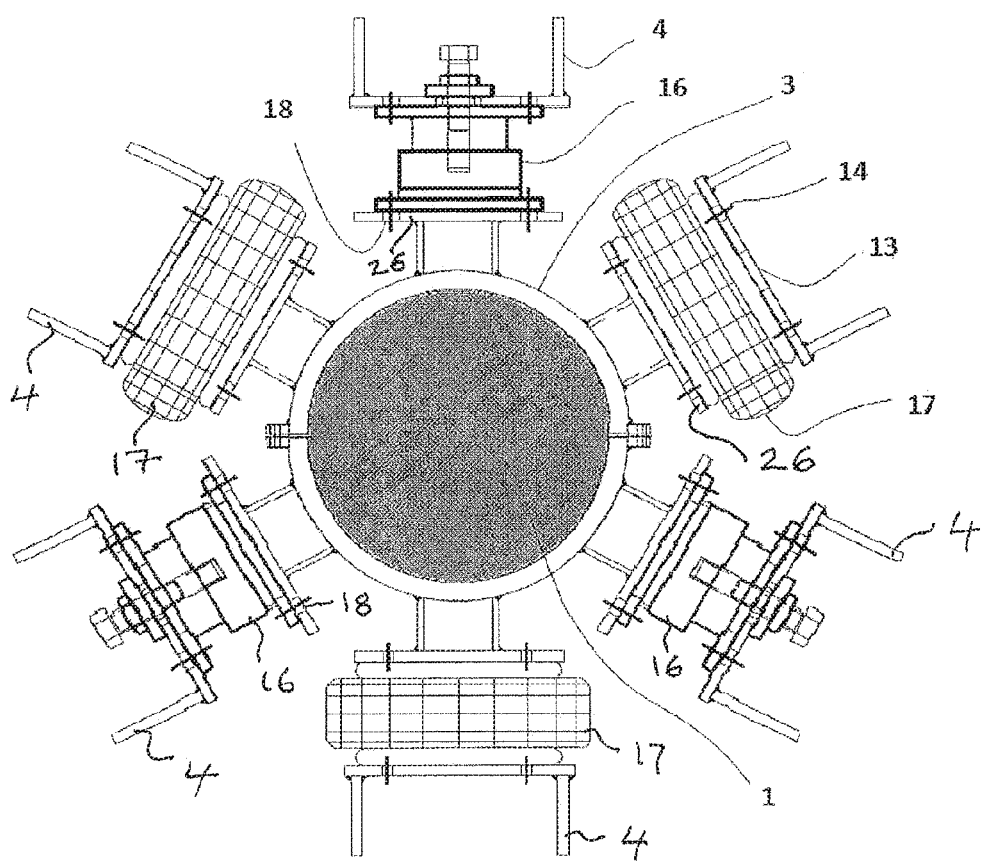
FIG. 5 is an end view of the assembly of the resonant element, nodal rings and support brackets.

FIGS. 3A and 3B illustrate the configuration of the nodal support rings 3 around the resonant element 1 which may be cylindrical solid steel bar, and the bolt holes 18 used to attach the nodal support rings 3 to the series of alternating bumpers 16 and airbags 17, as best seen in FIG. 5. In the case of a cylindrical solid steel bar resonant element, the nodal support ring 3 comprises six footings 26 spaced equally at 60 degree intervals around the resonant element. Each footing incorporates two bolt holes 18 for a total of 12 bolt holes per nodal support ring 3.

The support ring bracket assembly 4 is shown in FIGS. 4A, 4B and 4C (FIG. 4A represents the orientation of bracket assembly shown in FIG. 1, and FIG. 4B represents the orientation of the bracket assembly shown in FIG. 5). As can be seen in FIG. 4C, the support ring bracket assembly 4 does not have distinct bolt holes but rather mounting channels (bolt channels) 13 and 14 which allow for the manual adjustment of the position of the nodal support rings when required.

FIG. 5 illustrates the configuration of the complete assembly that maintains the position of the resonant element 1 during operation. The nodal support rings 3 are attached to the support ring bracket assembly 4 via the alternating series of bumpers 16 and airbags 17, spaced equally at 60 degree intervals around the resonant element. The bumpers 16 and airbags 17 are mounted to the nodal support rings 3 via bolt holes 18. The bumpers 16 and airbags 17 are then mounted on their opposite side to the support ring bracket assembly 4 via the bolt channels 14. The bolt channel 13 is used for either (a) large adjustment bolts used to manually center the resonant element while it is non-operational (i.e. during start-up) as is the case for the bumpers 16, or (b) air line connections used to adjust airbag pressure as is the case for airbags 17.

Figure 6:
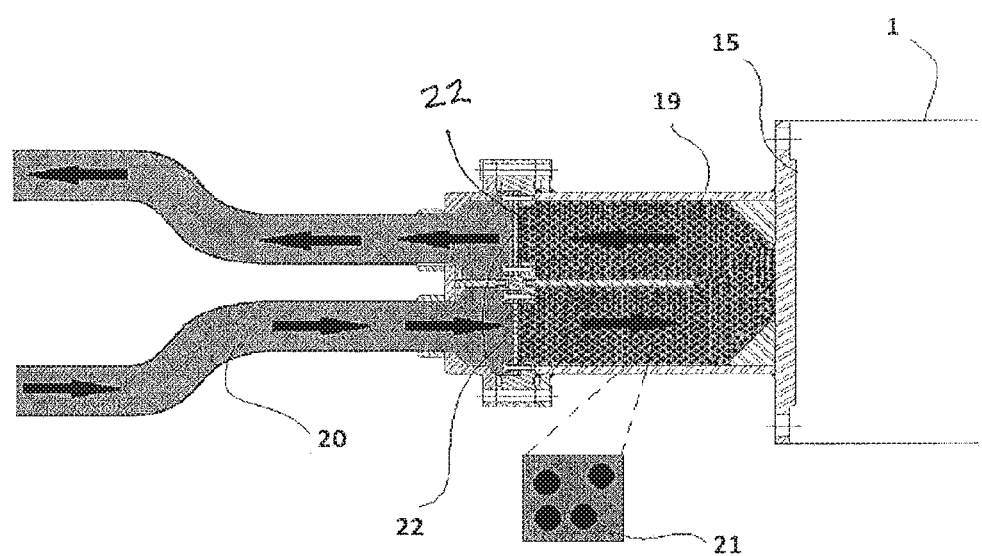
FIG. 6 is a side view of one end of the resonant element with a grinding chamber mounted thereon.

FIG. 6 illustrates one end of the resonant element 1 with a grinding chamber 19 physically mounted to the free end 15 of the resonant element. In this embodiment the process fluid medium 20 comprises both solids and fluids. The grinding chamber 19 is loaded with a grinding medium 21 through which the process fluid medium is allowed to pass through the grinding chamber 19 without extracting the grinding medium 21 with it at egress. This is accomplished using a series of complex screen assemblies 22 at the ingress and egress of the grinding chamber 19.

As will be apparent to those skilled in the art in the light of the foregoing disclosure, many alterations and modifications are possible in the practice of this invention without departing from the scope thereof. Accordingly, the scope of the invention is to be construed in accordance with the following claims.

The invention claimed is:

1. Use of a sonic reactor comprising:
   (a) a horizontally-oriented resonant element having two or more nodal positions at a resonant frequency, and having two free ends;
   (b) two resonance units each having an electromagnetic drive for electromagnetically driving the resonant element;
   (c) two or more nodal support rings which mount the resonant element to the two resonance units, the nodal support rings being adjustable in position relative to the resonant element and the resonance units to permit positioning of the two or more nodal support rings at the two or more nodal positions of the resonant element;
   (d) support ring bracket assemblies for affixing each of the two or more nodal support rings to one of the resonance units;
   (e) an alternating series of bumpers and airbags between each of the two or more nodal support rings and a respective support ring bracket assembly, the bumpers and airbags being attached in a fixed position to a respective nodal support ring; and
   (f) a grinding or mixing chamber mounted at one of the two free ends of the resonant element,
   said use further comprising the steps of:
   (i) electromagnetically driving the resonant element into a resonant state, such that the resonant element with the grinding or mixing chamber is in stable resonance, the mixing or grinding chamber containing a process fluid medium therein comprising solids and fluids;
   (ii) adjusting the position of the two or more nodal support rings relative to the resonant element to maintain the resonant element in said stable resonance during operation; and
   (iii) passing the process fluid medium through the grinding or mixing chamber one or more times,
   said use being for one of: fly ash beneficiation, pulverization and dispersion; fine ore grinding; preparing ready mix cement formulations; treatment of oil sands cuttings for oil recovery; spilled oil, water and oily water storage treatment; treatment of organic and inorganic industrial wastewater treatment; environmental remediation of contaminated soils; sodium dispersion and destruction of PCBs; biosludge conditioning; cellulosic biofuels processing; lignin processing; dispersion and deagglomeration of pigments; and dye destruction.

2. The use according to claim 1 for fly ash beneficiation, pulverization and dispersion.

3. The use according to claim 1 for fine ore grinding.

4. The use according to claim 1 for preparing ready mix cement formulations.

5. The use according to claim 1 for treatment of oil sands cuttings for oil recovery.

6. The use according to claim 1 for spilled oil, water and oily water storage treatment.

7. The use according to claim 1 for organic and inorganic industrial wastewater treatment.

8. The use according to claim 1 for environmental remediation of contaminated soils.

9. The use according to claim 1 for sodium dispersion and destruction of PCBs.

10. The use according to claim 1 for biosludge conditioning.

11. The use according to claim 1 for cellulosic biofuels processing.

12. The use according to claim 1 for lignin processing.

13. The use according to claim 1 for dispersion and deagglomeration of pigments.

14. The use according to claim 1 for dye destruction.

15. The use according to claim 2, wherein the process fluid medium further comprises fly ash.

16. The use according to claim 1, wherein the sonic reactor further comprises a second grinding or mixing chamber mounted at the second free end of the resonant element, and the resonant element is in stable condition with said two grinding or mixing chambers, both said grinding or mixing chambers containing the process fluid medium, and wherein the process fluid medium is passed through both said grinding or mixing chambers one or more times.

* * * * *